(12) United States Patent
Yang

(10) Patent No.: US 9,057,398 B2
(45) Date of Patent: Jun. 16, 2015

(54) HEAVY-LOAD SUCTION CUP DEVICE

(71) Applicant: UNIVERSAL TRIM SUPPLY CO., LTD., New Taipei (TW)

(72) Inventor: Shih-Sheng Yang, New Taipei (TW)

(73) Assignee: Universal Trim Supply Co., Ltd., New Taipei (TW)

( * ) Notice: Subject to any disclaimer, the term of this patent is extended or adjusted under 35 U.S.C. 154(b) by 0 days.

(21) Appl. No.: 14/079,652

(22) Filed: Nov. 14, 2013

(65) Prior Publication Data

US 2014/0197288 A1 Jul. 17, 2014

(30) Foreign Application Priority Data

Jan. 11, 2013 (CN) .......................... 2013 1 0012005

(51) Int. Cl.
*F16B 47/00* (2006.01)
*B25J 15/06* (2006.01)

(52) U.S. Cl.
CPC .................................. *F16B 47/006* (2013.01)

(58) Field of Classification Search
CPC ................................. F16B 47/006; F16B 47/00
USPC ............. 248/683, 205.5, 205.6, 205.8, 205.9, 248/206.2, 309.3, 467; 294/64.1, 183, 63.2, 294/186, 188
See application file for complete search history.

(56) References Cited

U.S. PATENT DOCUMENTS

| 3,970,341 | A | * | 7/1976 | Glanemann et al. | 294/186 |
| 5,184,858 | A | * | 2/1993 | Arai | 294/185 |
| 5,639,134 | A | * | 6/1997 | Rusch et al. | 294/187 |
| 6,393,625 | B1 | * | 5/2002 | Tsai | 4/255.02 |
| 7,673,914 | B2 | * | 3/2010 | Liao | 294/185 |
| 8,235,337 | B2 | * | 8/2012 | Ostendarp | 248/205.7 |
| 8,496,222 | B2 | * | 7/2013 | Li | 248/683 |
| 2002/0175527 | A1 | * | 11/2002 | Huang | 294/64.1 |
| 2006/0231705 | A1 | * | 10/2006 | Liu | 248/205.5 |
| 2007/0257167 | A1 | * | 11/2007 | Richter | 248/205.8 |
| 2012/0112023 | A1 | * | 5/2012 | Tollman | 248/205.7 |
| 2014/0027588 | A1 | * | 1/2014 | Chen | 248/205.3 |

* cited by examiner

*Primary Examiner* — Jonathan Liu
*Assistant Examiner* — Muhammad Ijaz
(74) *Attorney, Agent, or Firm* — Leong C. Lei

(57) ABSTRACT

The present invention generally relates to the field of suction cups, and more particularly to a rotatable multi-cup suction device. The heavy-load suction cup device includes a cup body that is directly contactable with an adhered surface. The cup body is provided thereon with a cap that defines, together with the cup body, a cavity. The cup body includes a coupling rod. The cap includes a mounting hole formed in a central portion thereof for receiving the coupling rod to extend therethrough. The cup body includes an air evacuation hole that is connectable to and thus communicates with an air evacuation device. The device can notify a user when the suction force gets weakening in order to restore or replenish the suction force and has an improved functionality of self-inspection. Further, the suction cup device has an increased load capacity, an extended life span, and is reusable for numerous times.

5 Claims, 5 Drawing Sheets

HEAVY-LOAD SUCTION CUP DEVICE

(a) TECHNICAL FIELD OF THE INVENTION

The present invention generally relates to the field of suction cup product, and more particularly to a heavy-load suction cup device.

(b) DESCRIPTION OF THE PRIOR ART

In the modern technology, a suction cup is used to affix, through a suction force, to an adhered surface, such as a wall, a door/window, or a car windshield. The use is convenient and is thus widely used by general people. However, heretofore, a suction cup is affixed to an adhered surface by means of a cup body and the plastic material of the cup body. For example, China Patent Application No. 200810134356.9 discloses an invention having a title of "Structure of Suction Cup", which comprises a suction cup and a body of adhesives. The body of adhesives has a first surface and a second surface, wherein the first surface is coupled to the suction cup and the second surface is physically and tightly affixed to an object. Such a structure of a suction cup has the following disadvantages:

(1) The body of adhesives has a relatively weak adhesion force and this limits the load-carrying capacity of the suction cup.

(2) The structure of suction cup is poor in reuse after being removed, for the body of adhesives suffers reduced adhesion after repeated uses and this limits cyclic use thereof.

(3) Such a suction cup has a short life span and is affected by environmental factors, such as temperature and humidity.

(4) Such a suction cup cannot remind a user to restore the suction force of the suction cup or to carry out self-inspection when the suction force of the suction cup weakens.

SUMMARY OF THE INVENTION

An object of the present invention is to overcome the deficiencies of the state of the art by providing a heavy-load suction cup device. The heavy-load suction cup device notifies a user to restore or replenish suction force of the suction cup after the suction force gets weakening and provides an improved capability of self-inspection. Further, it has a great load-carrying capability, an extended life span, and can be cyclically used for a great number of times.

To achieve the above technical object, the present invention is realized with the following technical solution:

The present invention provides a heavy-load suction cup device, which comprises a cup body that is directly contactable with an adhered surface. The cup body is provided thereon with a cap that defines, together with the cup body, a cavity. The cup body comprises a coupling rod. The cap comprises a mounting hole formed in a central portion thereof for receiving the coupling rod to extend therethrough. The cup body comprises an air evacuation hole that is connectable to and thus communicates with an air evacuation device.

In the present invention, the cup body has a bottom in which a full turn of annular groove is formed. The cup body also has a top on which a raised curved wall that defines therein a cavity is formed. The cavity defined in the raised curved wall is in communication with a cavity defined by the annular groove. The air evacuation hole is formed in the raised curved wall.

As a technical improvement of the above arrangement, the air evacuation device comprises an air pump. The air evacuation hole is connected, via a one-way inlet valve, to the air pump. The air pump has an outlet opening to which a one-way outlet valve is mounted.

As a further technical improvement of the above arrangement, the cap has a top in which an accommodation trough is formed for receiving and positioning therein the air pump and the one-way outlet valve. The cap also comprises a through hole formed therein for receiving the one-way inlet valve to extend therethrough.

In the present invention, a flip cover is arranged above the air pump to cover and hold down the air pump and the one-way outlet valve. The flip cover has a top in which an opening is formed for exposing a pressing face of the air pump and also exposing the one-way outlet valve. The flip cover has a pivotally jointed portion that is pivotally connected to a top of the coupling rod.

In the present invention, the coupling rod comprises a T-shaped rod and the coupling rod has a T-shaped terminal end that is embedded in the cup body and is subjected to injection molding with the cup body so as to have the coupling rod and the cup body combined together.

In the present invention, the cup body is made of a plastic material showing a property of adhering.

Compared to the prior art, the present invention provides the following advantages:

(1) The present invention uses an air evacuation device, which is an air pump, to evacuate air so as to make an interior cavity of the cup body a negative pressure cavity thereby providing dual negative pressure cavities that help greatly increase the load-carrying capacity of the suction cup.

(2) The present invention provide a one-way outlet valve mounted to the air pump and a one-way inlet valve connected between the cup body and the air pump, so that pressing down a pressing surface of the air pump causes air contained in the air pump to evacuate. Then, releasing the air pump allows the air pump to restore the position thereof so as to evacuate air from the cavity of the cup body and thus greatly enhancing the suction force of the suction cup. When air contained in the cup body and the air pump is evacuated, the air pump shows a collapsed condition. When the collapsed air pump gets expanded, indication of air leaking into the cup body is shown and weakening of the suction force of the suction cup is reflected so that a user can be notified, through the change of the air pump, to inspect if the suction force weakens and the user is also notified as to whether to remove and/or re-install or to press down the air pump again for re-evacuation of air for restoration of the suction force. Thus, the device provides improved functionalities of notification and self-inspection of suction force.

(3) The present invention provides a raised curved wall on the top of the cup body to spread the force that an object applies to the suction cup so as to provide suction cup with improved load capacity.

(4) The present invention provides a suction cup that can be repeatedly used for numerous times, has an extended life span, is not affected by the surrounding temperature and humidity, and shows excellent adaptability.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
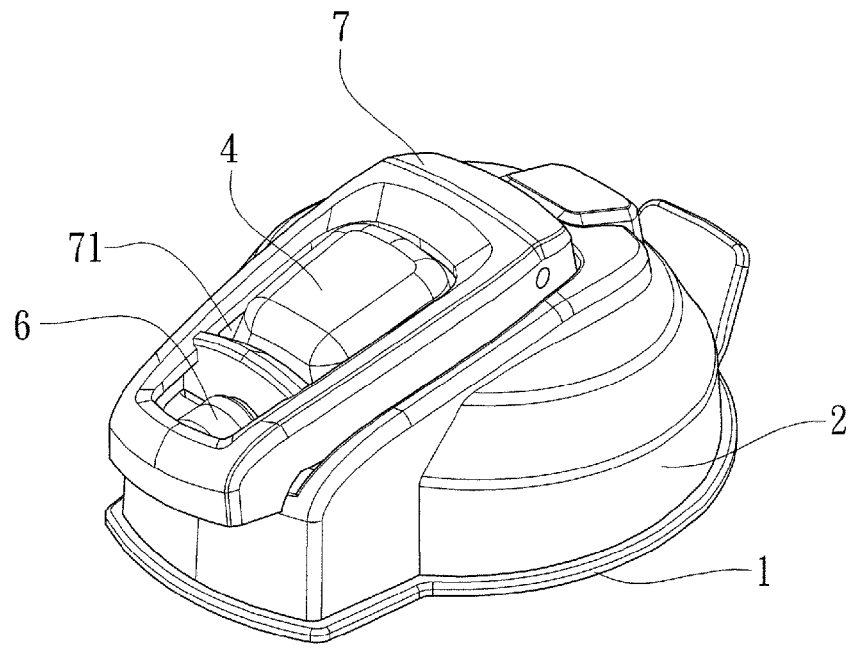
FIG. 1 is a perspective view showing a heavy-load suction cup device according to the present invention.
Figure 2:
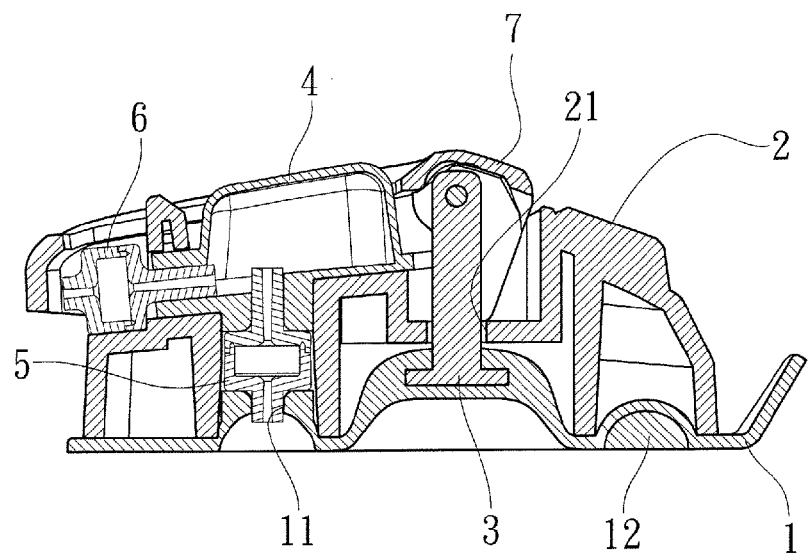
FIG. 2 is a cross-sectional view of the heavy-load suction cup device shown in FIG. 1.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1-5, the present invention provides a heavy-load suction cup device, which comprises a cup body 1 that is directly contactable with an adhered surface and a cap 2. The cup body 1 receives the cap 2 to be positioned thereon so as to define, with respect to the cup body 1, a cavity. The cup body 1 comprises a coupling rod 3. The cap 2 comprises a mounting hole 21 formed in a central portion thereof for receiving the coupling rod 3 to extend therethrough. The cup body 1 comprises an air evacuation hole 11 that is connectable to and thus communicates with an air evacuation device. In the present invention, the cup body 1 is made of a plastic material showing a property of adhering. Further, as shown in FIG. 7, the coupling rod 3 is a T-shaped rod and the coupling rod 3 has a T-shaped terminal end 31 that is embedded in the cup body 1 and can be subjected to injection molding with the cup body 1 so as to have the coupling rod 3 and the cup body 1 combined together.

Figure 5:
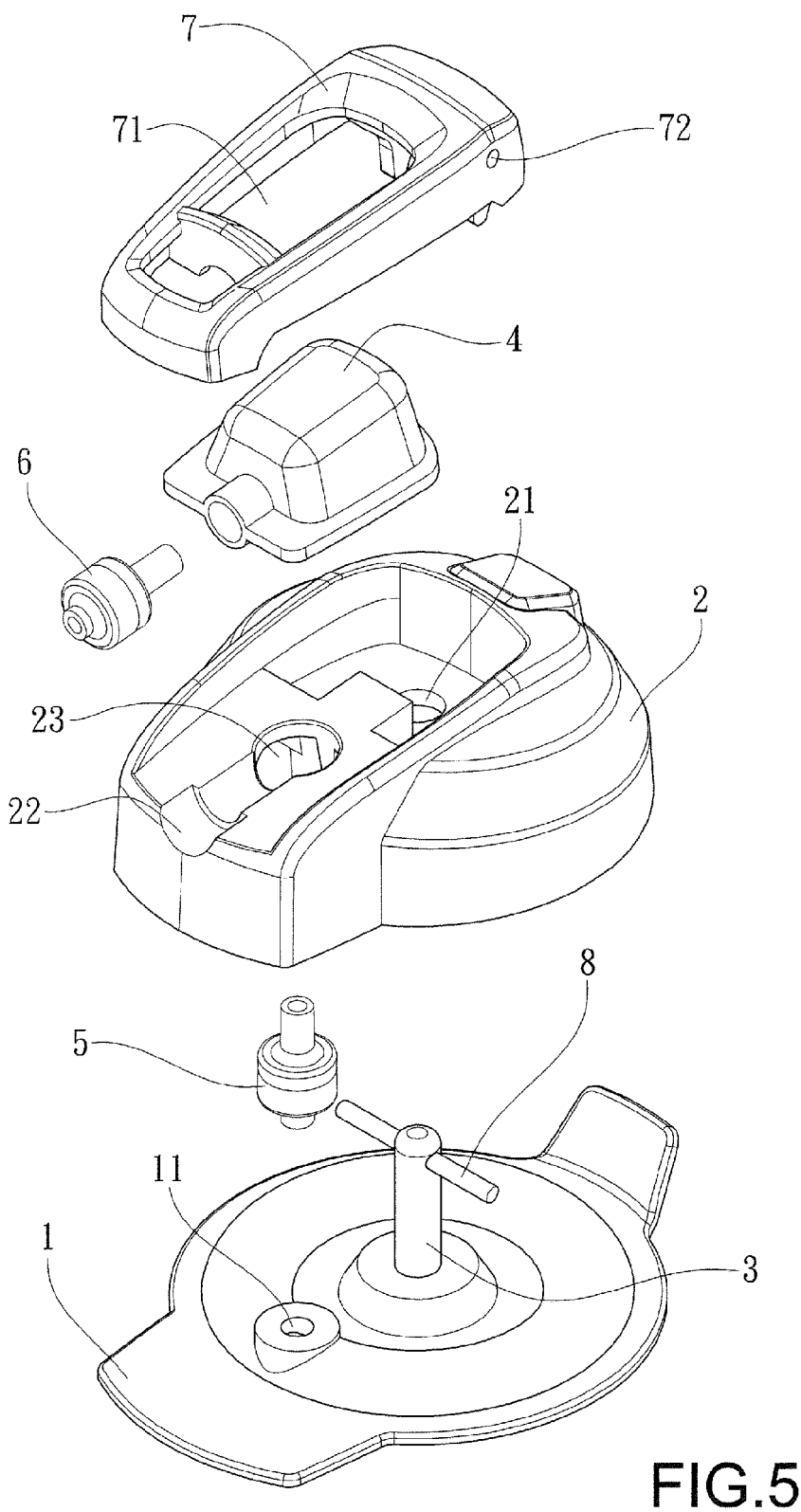
FIG. 5 is a perspective view showing the heavy-load suction cup device according to the present invention (in an exploded condition).
Figure 6:
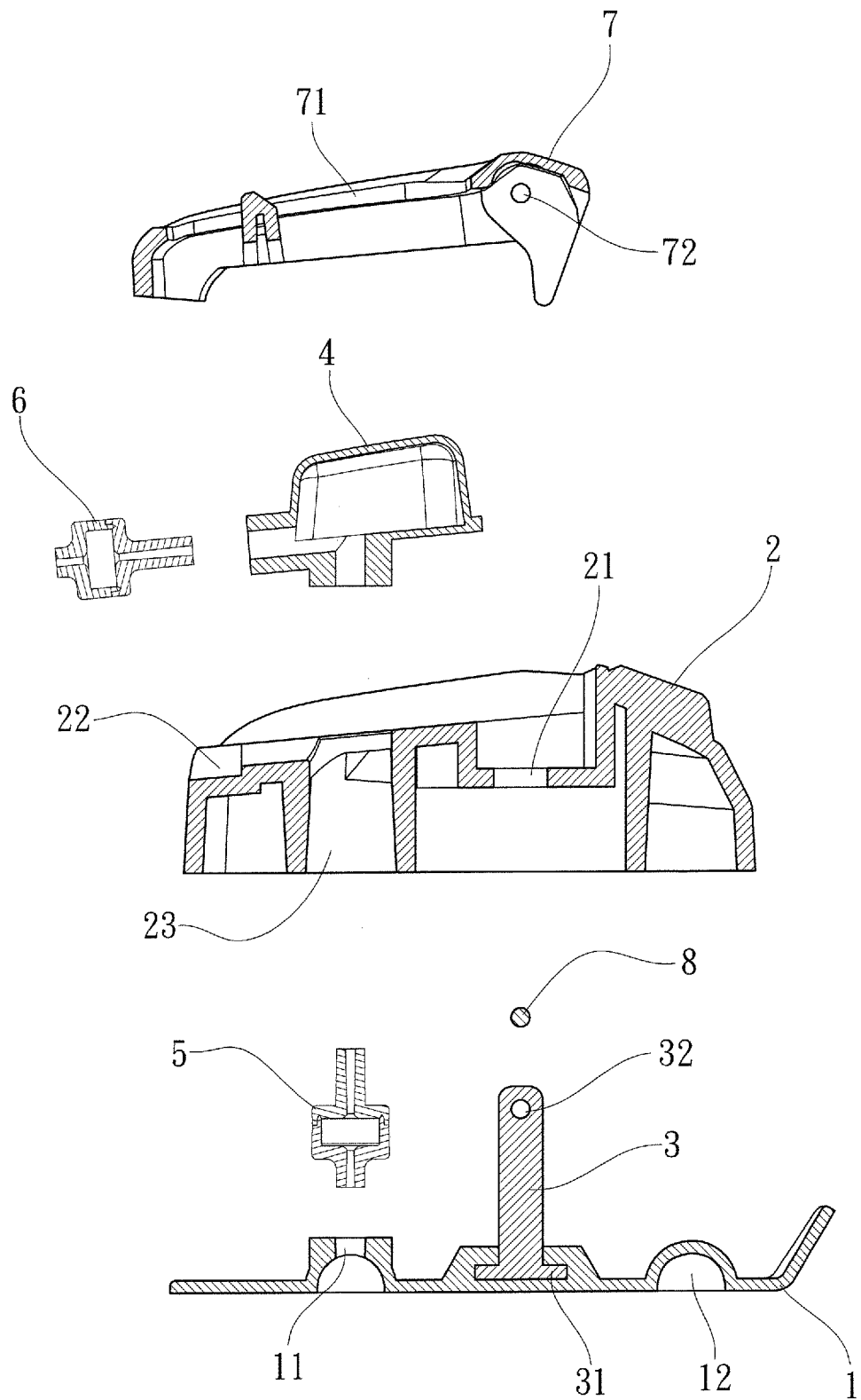
FIG. 6 is a cross-sectional view of the heavy-load suction cup device according to the present invention (in an exploded condition).
Figure 7:
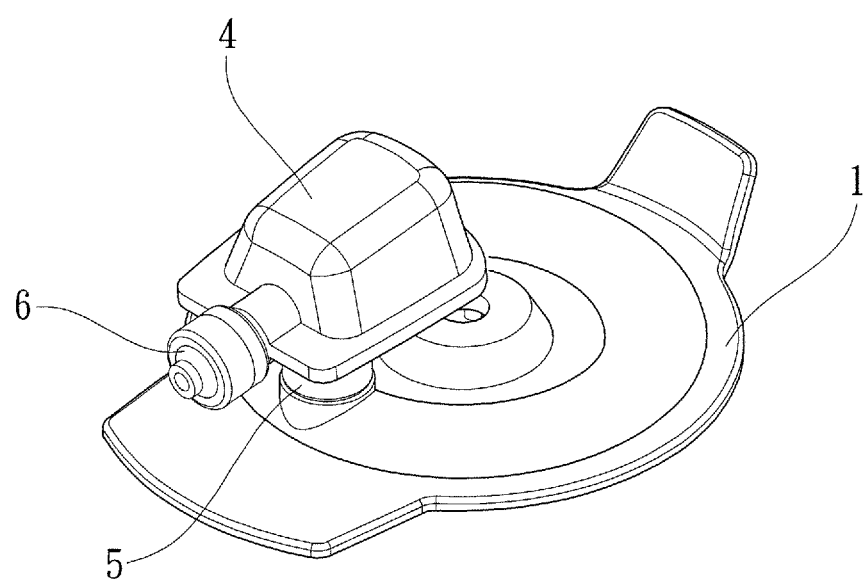
FIG. 7 is a perspective view showing connection among a cup body, an air evacuation device, an inlet valve, and an outlet valve according to the present invention.

As shown in FIGS. 5-7, the cup body 1 has a bottom in which a full turn of annular groove 12 is formed. The cup body 1 also has a top on which a raised curved wall 13 that defines therein a cavity is formed. The cavity defined in the raised curved wall 13 is in communication with a cavity defined by the annular groove 12. The air evacuation hole 11 is formed in the raised curved wall 13.

As shown in FIGS. 4-7, the air evacuation device comprises an air pump 4, a one-way inlet valve 5, and a one-way outlet valve 6. The air evacuation hole 11 is coupled to the one-way inlet valve 5 and is thus connected to and in communication with the air pump 4. The air pump 4 has an outlet opening to which the one-way outlet valve 6 is mounted.

Figure 3:
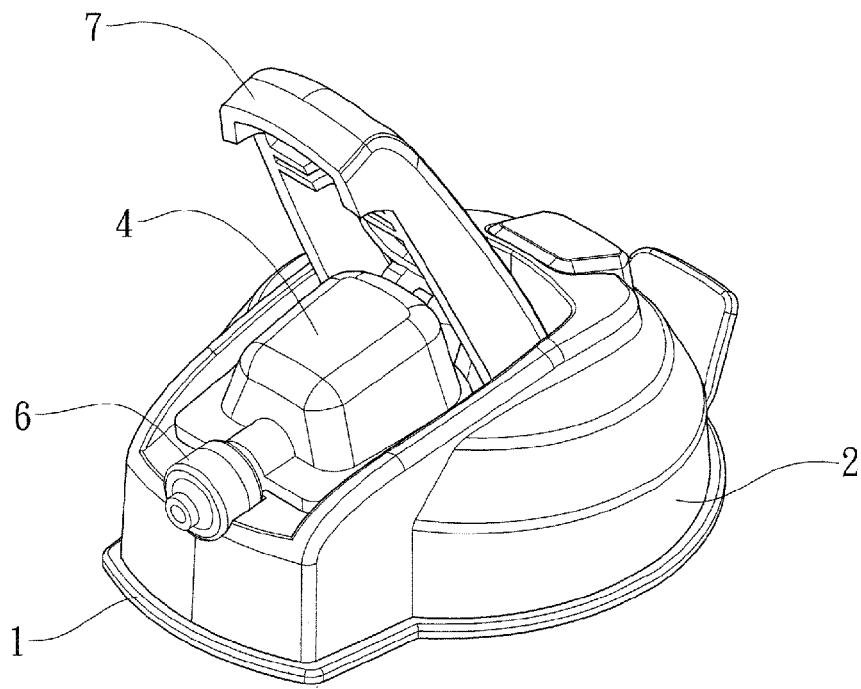
FIG. 3 is a perspective view of the heavy-load suction cup device according to the present invention (in a cover opened condition).
Figure 4:
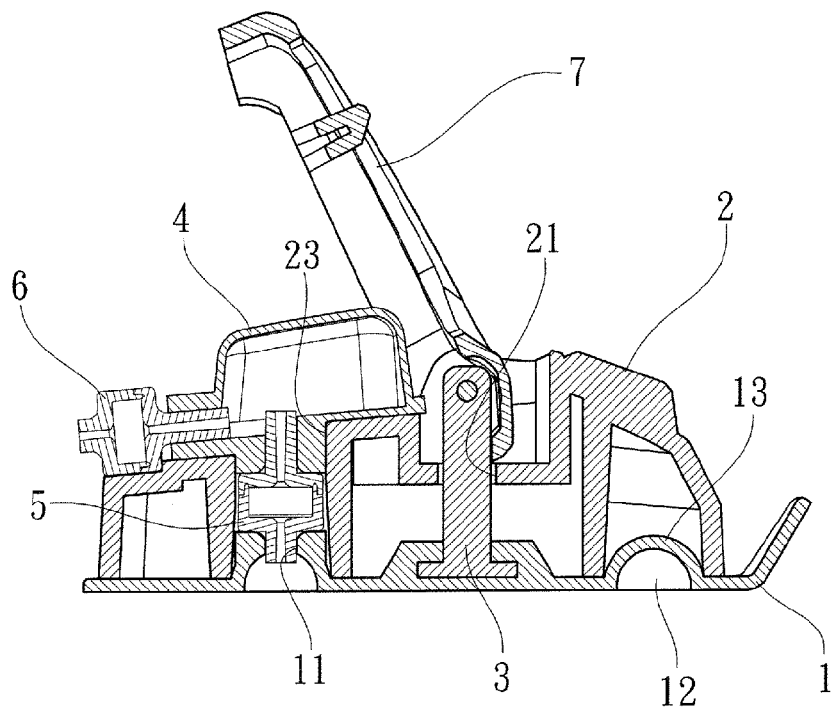
FIG. 4 is a cross-sectional view of the heavy-load suction cup device shown in FIG. 3.

As shown in FIGS. 3 and 5-6, the cap 2 has a top in which an accommodation trough 22 is formed for receiving and positioning therein the air pump and the one-way outlet valve 6. The cap 2 also comprises a through hole 23 formed therein for receiving the one-way inlet valve 5 to extend therethrough.

Further, in the present invention, a flip cover 7 is arranged above the air pump 4 to cover and hold down the air pump 4 and the one-way outlet valve 6. The flip cover 7 has a top in which an opening 71 is formed for exposing a pressing face of the air pump 4 and also exposing the one-way outlet valve.

The flip cover 7 has a pivotally jointed portion in which a pivotal-joint hole 72 is formed. The coupling rod 3 has a top in which a pin hole 32 is formed. A pivot pin 8 is received through the pin hole 32 and the pivotal-joint hole 72 to pivotally connect the flip cover 7 to the top of the coupling rod 3, so as to achieve easy opening and closing of the flip cover 7 and to enable the air pump 4 to be normally operated.

The operation of the heavy-load suction cup device according to the present invention will be described as follows:

(1) pressing down the pressing face of the air pump 4 to evacuate air contained in the air pump 4;

(2) then, releasing the air pump 4 to allow the air pump 4 to automatically return so as to completely evacuate the air contained in the cavity of the cup body 1, allowing vacuum to be formed in the cavity of the bottom annular groove 12 so as to tightly affix the cup body 1 to an adhered surface and thus greatly improve the suction force of the suction cup; and (3) the air pump 4 getting collapsed after the air contained in the cup body 1 and the air pump 4 is evacuated, whereby when the collapsed air pump gets expanded, indication of air leaking into the cup body 1 is shown and weakening of the suction force of the suction cup is reflected so that a user can be notified, through the change of the air pump 4, to inspect if the suction force weakens and the user is also notified as to whether to remove and/or re-install or to press down the air pump 4 again for re-evacuation of air for restoration of the suction force. Thus, the device provides improved functionalities of notification and self-inspection of suction force.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A heavy-load suction cup device, comprising a cup body, a cap, a coupling rod, an air pump, a one-way inlet valve, a one-way outlet valve, and a flip cover, characterized in that:

the cup body receives the coupling rod mounted thereto, the cup body having a bottom in which an annular groove is formed, the cup body having a top on which a raised curved wall defined therein a cavity, the raised curved wall defining therein a cavity that is in communication with the cavity of the bottom annular groove, an air evacuation hole being formed in the raised curved wall, an air evacuation device being coupled to the air evacuation hole;

the air pump, the one-way inlet valve, and the one-way outlet valve collectively form the air evacuation device, the air evacuation hole of the cup body being coupled to the one-way inlet valve so as to connect to the air pump, the air pump having an outlet opening to which the one-way outlet valve is mounted, wherein the air pump comprises a pressing face that is depressible to collapse the air pump to evacuate air from interior of the air pump and wherein expansion of the collapsed air pump functions as indication of air leaking into the interior of the air pump and thus the cup body;

the cap has a top in which an accommodation trough is formed to receive and position the air pump and the one-way outlet valve therein, the cap comprising a through hole formed therein to receive the one-way inlet valve to extend therethrough; and the flip cover has a pivotally jointed portion that is pivotally connected to a top of the coupling rod.

2. The heavy-load suction cup device according to claim 1, characterized in that: the flip cover has a top in which an opening is formed for exposing the pressing face of the air pump.

3. The heavy-load suction cup device according to claim 1, characterized in that: the flip cover has a top in which an opening is formed for exposing the pressing face of the air pump and the one-way outlet valve.

4. The heavy-load suction cup device according to claim 1, characterized in that: the coupling rod comprises a T-shaped rod and the coupling rod has a T-shaped terminal end that is embedded in the cup body and is subjected to injection molding with the cup body so as to have the coupling rod and the cup body combined together.

5. The heavy-load suction cup device according to claim 1, characterized in that: the cup body is made of a plastic material showing a property of adhering.

* * * * *